United States Patent [19]

Nemoto et al.

[11] Patent Number: 5,125,044
[45] Date of Patent: Jun. 23, 1992

[54] IMAGE PROCESSING APPARATUS AND METHOD IN WHICH A PLURALITY OF ACCESS CIRCUITS CAN SIMULTANEOUSLY PERFORM ACCESS OPERATIONS

[75] Inventors: Kouzou Nemoto; Minoru Makita, both of Tochigi; Mitsunobu Isobe, Machida; Kenzo Takeichi, Tochigi, all of Japan

[73] Assignee: Hitachi, Ltd., Tokyo, Japan

[21] Appl. No.: 647,755

[22] Filed: Jan. 30, 1991

[30] Foreign Application Priority Data

Feb. 8, 1990 [JP] Japan .................. 2-27176

[51] Int. Cl.⁵ .......................................... G06K 9/00
[52] U.S. Cl. ................................. 382/49; 382/27; 364/242.91; 364/243.1; 364/243.6; 364/942.04; 364/964.7; 364/DIG. 1; 364/DIG. 2
[58] Field of Search ............... 382/49, 27; 364/200, 364/900

[56] References Cited

U.S. PATENT DOCUMENTS

| | | | |
|---|---|---|---|
| 4,058,850 | 11/1977 | Sheikh | 364/900 |
| 4,438,494 | 3/1984 | Budde et al. | 364/200 |
| 4,449,199 | 5/1984 | Doigle | 364/900 |
| 4,484,346 | 11/1984 | Sternberg et al. | 382/49 |
| 4,713,789 | 12/1987 | Suzuki | 382/49 |
| 4,718,091 | 1/1988 | Kobayashi et al. | 382/49 |
| 4,876,651 | 10/1989 | Dawson et al. | 382/49 |
| 4,901,360 | 2/1990 | Shu et al. | 382/49 |
| 5,022,090 | 6/1991 | Masaki et al. | 382/49 |

*Primary Examiner*—Leo H. Boudreau
*Assistant Examiner*—Barry Stellrecht
*Attorney, Agent, or Firm*—Antonelli, Terry Stout & Kraus

[57] ABSTRACT

An image processing apparatus which allows a plurality of access circuits to perform access operations simultaneously including a first access circuit for writing a video signal in digital form, obtained by A/D conversion, into an image memory, a plurality of process memories for storing necessary data, taken out from the video signals stored in the image memory, a plurality of second access circuits for accessing the image memory and the process memories, and performing specified data processing to obtain necessary data from the image memory, and a third access circuit having the same functions as the second access circuits and a function to control the operation of the first and second access circuits. Access switchover circuits are provided for each of the image memory and process memories, for switching over access to the memories to either the first, second or third access circuits.

2 Claims, 4 Drawing Sheets

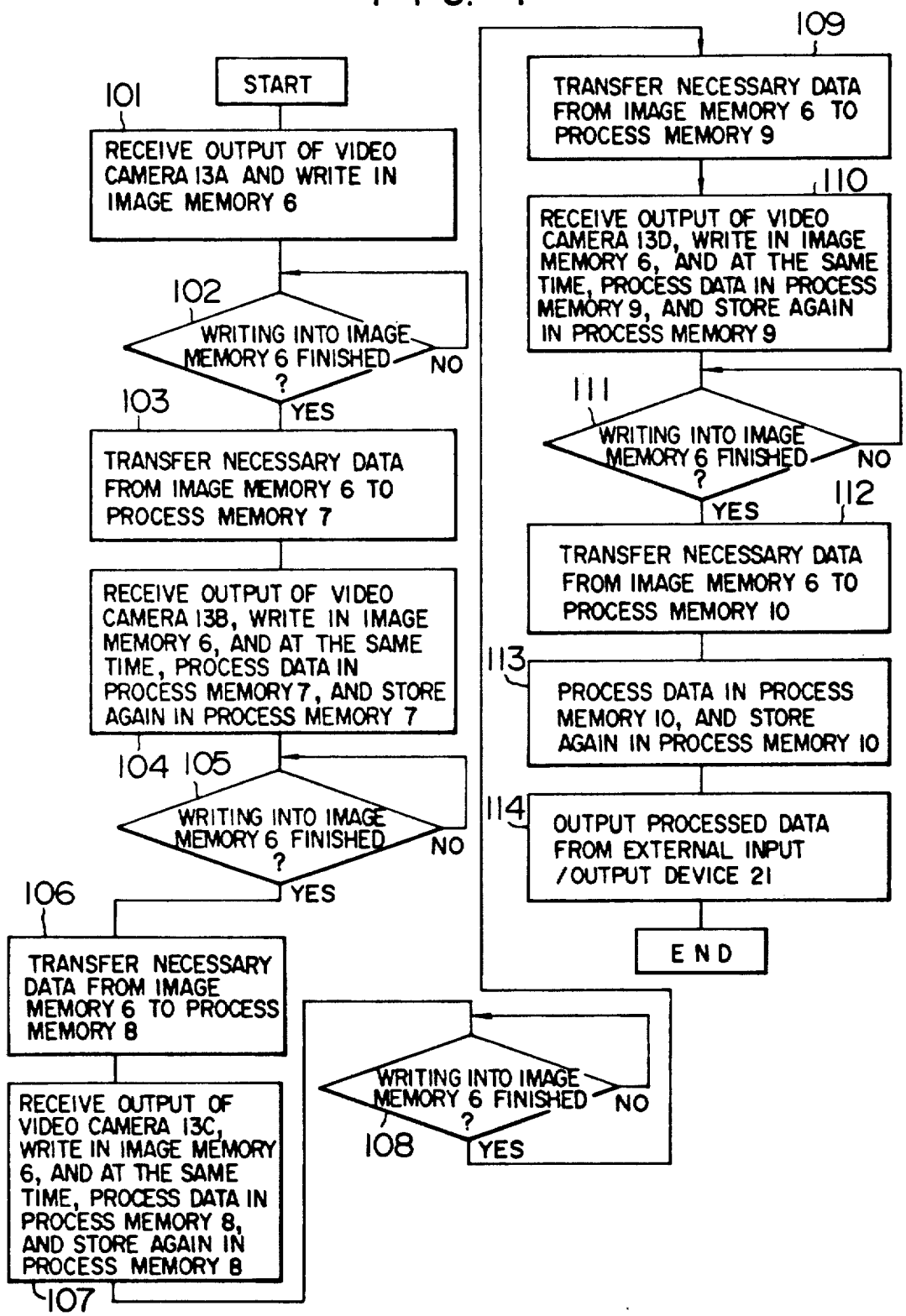

IMAGE PROCESSING APPARATUS AND METHOD IN WHICH A PLURALITY OF ACCESS CIRCUITS CAN SIMULTANEOUSLY PERFORM ACCESS OPERATIONS

BACKGROUND OF THE INVENTION

This invention relates to an image processing apparatus for processing image video signals from an image signal source, such as a video camera, and more particularly to an image processing apparatus and method, which have made it possible to simultaneously access an image memory for processed input data and a process memory for data by a plurality of access circuits.

A known conventional image processing apparatus for processing video signals is an apparatus which has an image memory for storing digitized input image signals and a process memory for storing processed video signals, and which is arranged to access those memories with a plurality of access circuits to process or output the video signals.

In the above-mentioned type of image processing apparatus, between the access circuits there are provided access control circuits for monitoring the operating conditions and controlling the operation of the access circuits.

The access control circuits control the access circuits so that the access circuits operate mutually independently and that the same memory is not accessed by a plurality of access circuits. More specifically, while a first access circuit is in the process of accessing the memory, if a second access circuit is going to access the memory, the second access circuit sends an access request signal to the first access circuit and waits. The second access circuit does not become accessible until an access permission signal is sent from the first access circuit.

The image processing apparatus such as this has a problem that processing time is long because a next access circuit starts its access operation when some other access circuit has finished an access operation.

If this problem is solved by using parallel processing, another problem arises that it is necessary to provide many access buses and circuits for access switchover and the circuit configuration becomes complicated.

If video signals are to be processed which are sent from a plurality of video cameras, a possible method is to provide each video camera with a corresponding memory and perform parallel processing of video signals from different video cameras. In this case, the process proceeds relatively quickly, but a problem with this method is that the image processing apparatus is complicated, large in scale, and expensive. On the other hand, another possible method is to use a common memory for different video cameras and thereby prevent the image processing apparatus from becoming complicated, larger in scale, and high in cost. However, a problem with this method is that video signals from different video cameras cannot be processed simultaneously and a long time is required for the process.

SUMMARY OF THE INVENTION

A first object of this invention is to solve the above problems, and provide an image processing apparatus and method which use a simplified circuit configuration and are capable of quick image processing.

A second object of this invention is to provide a low-cost image processing apparatus and method in which the circuit configuration is not complicated and not large in scale but capable of processing a plurality of video signals quickly.

In order to achieve the first and second objects, this invention is characterized by the following arrangements:

(a) One of a plurality of access circuits is provided with an additional function to monitor and control the access operation of the whole system (b) Multi-input-one output access switchover circuits are provided between the access bus and the memories (c) A command/status register is provided to control the access switchover circuits and to control the operation and monitor the operating conditions of the access circuits.

The access circuit provided with a monitor and control function in used to write commands and monitor status data.

The access circuit provided with a monitor and control function has information indicating the condition of the other access circuits, and allows a plurality of access circuits, which do not affect one another, to operate at the same time. By use of the access circuits as described, it is possible without making any errors to simultaneously input digital input data and process digital data which has already been input. And, a large amount of image data can be processed quickly.

Even when there are a plurality of digital data being input, it is possible without any error to carry out reading of a piece of data and processing of digital data which has already been read, with the result that processing time can be reduced. Among the processes to be performed include highlighting of a specific image data and binary digitization of black and white colors.

As has been described, according to this invention, by making one of a plurality of access circuits control the other access circuits, it is possible to simultaneously access the memory by a plurality of access circuits. By optimally distributing access timing among the access circuits, data can be processed quickly and the composition of the memories and so on can be simplified.

When there are a plurality of images being input, inputting of images and processing of image data can be performed simultaneously. This makes processing time substantially reduced.

BRIEF DESCRIPTION OF THE DRAWINGS

FIG. 4 is a flowchart showing the operation of the above other embodiment.

DESCRIPTION OF THE PREFERRED EMBODIMENTS

Figure 1:
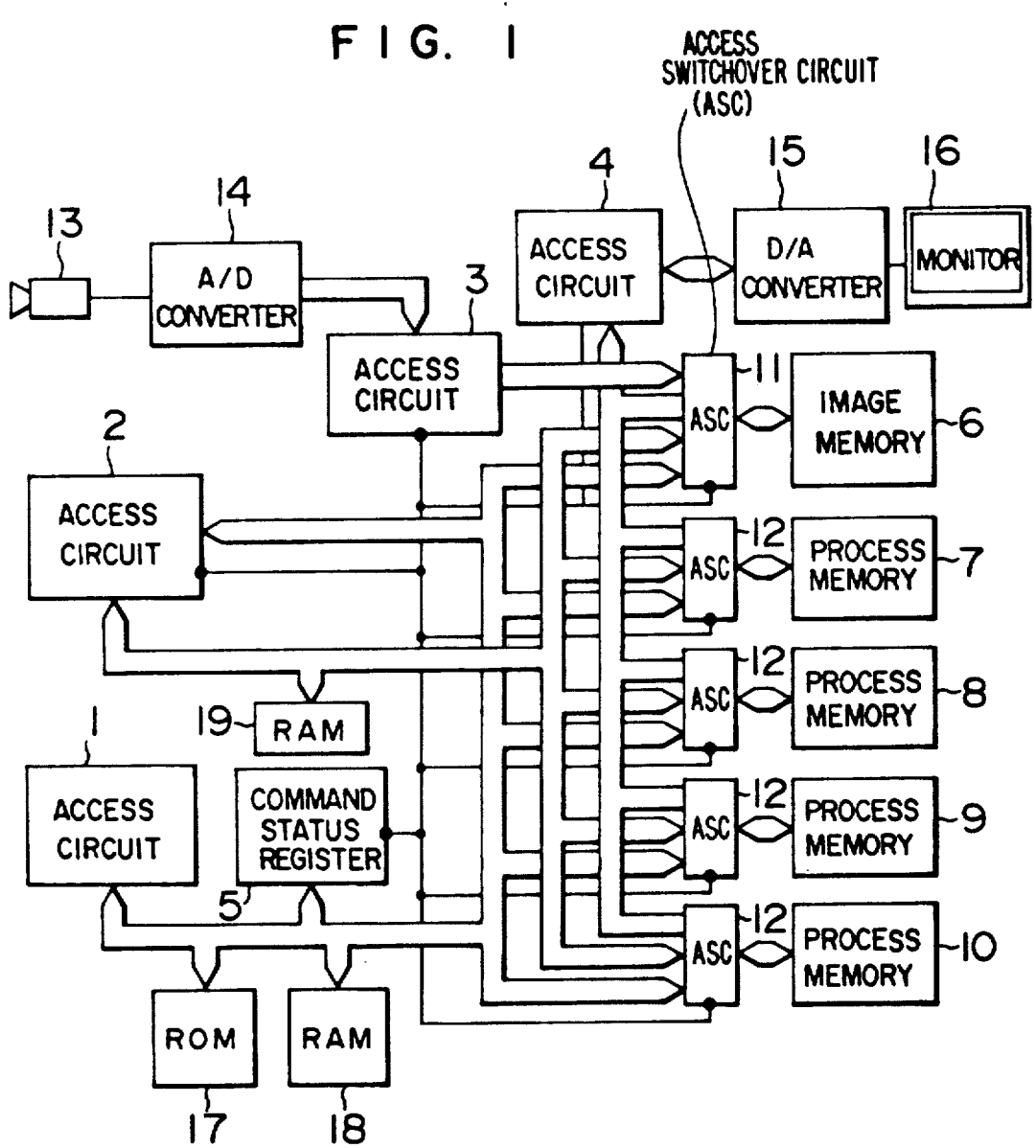
FIG. 1 is a block diagram showing an embodiment of the image processing apparatus according to this invention.

In FIG. 1, which is a block diagram showing an embodiment of the image processing apparatus according to this invention, reference numerals 1 to 4 indicate access circuits, 5 is a command/status register, 6 is an image memory, 7 to 10 are process memories, 11 and 12 are access switchover circuits (ASC's), 13 is a video camera, 14 is an A/D (analog/digital) converter circuit, 15 is a D/A (digital/analog) converter circuit, 16 is a monitor, 17 is a ROM (read only memory), and 18 and 19 are RAMs (random access memories).

The image memory 6 is made to represent one pixel by many bits and can also store the gradation of density. The process memories 7 to 10 store processed data, and therefore, the effective number of bits to represent one pixel may be less that of the image memory 6. The image memory and the process memories may be the same in hardware construction.

In FIG. 1, a video signal outputted by the video camera 13 is converted by the A/D converter circuit 14 into digital form, and sent to the access circuit 3. This access circuit 3 is used to access the image memory 6 to write digital data from the converter circuit 14. Digital data outputted from the access circuit 3 is provided to the image memory 6 through the access switchover circuit 11. The access circuits 1, 2 are used for processing digital data stored in the image memory 6. By accessing the image memory 6, the access circuits 1, 2 read digital data from the image memory 6 through the access switchover circuit 11, and processes the data. After this, the access circuits 1, 2 access any of the process memories 7 to 10, and feeds the processed data into the process memory through the access switchover circuit 12. The access circuit 4 is used to read processed digital data stored in the process memories 7 to 10. The access circuit 4 accesses any of the process memories 7 to 10, and reads digital data via the access switchover circuit 12. The read-out digital data is converted by the D/A converter circuit 15 into analog form and sent as a video signal to the monitor 16.

The access circuit 1 is a central processing apparatus and is provided with a ROM 17 and a RAM 18, and the ROM 17 has a program stored therein. Digital data read by the access circuit 1 from the image memory 6 is stored in the RAM 18 and then processed according to a program stored in the ROM 17.

This access circuit 1 controls the other access circuits 2 to 4. For this purpose, the access circuit 1 is provided with a commmand/status register 5. This command/status register 5 stores a control command and data representing the status of the access circuits 2 to 4. From this data, the status of each of the access circuits 2 to 4 is determined. More specifically, according to the status of the access circuits 2 to 4, the access circuit 1 writes command data in the command register of the command/status register 5, and issues commands to the access circuits 2 to 4. On receiving commands, the access circuits 2 to 4 execute the commands and, write status data representing the current status in the status register of the command/status register 5, thereby reporting the status to the access circuit 1.

The access circuit 2 is provided with a RAM 19 storing an operation program of each command issued by the access circuit 1, and executes a corresponding operation program each time a command is issued by the access circuit 1.

The access switchover circuits 11 and 12 are switched over from one circuit to another according to a command from the access circuit 1.

Figure 2:
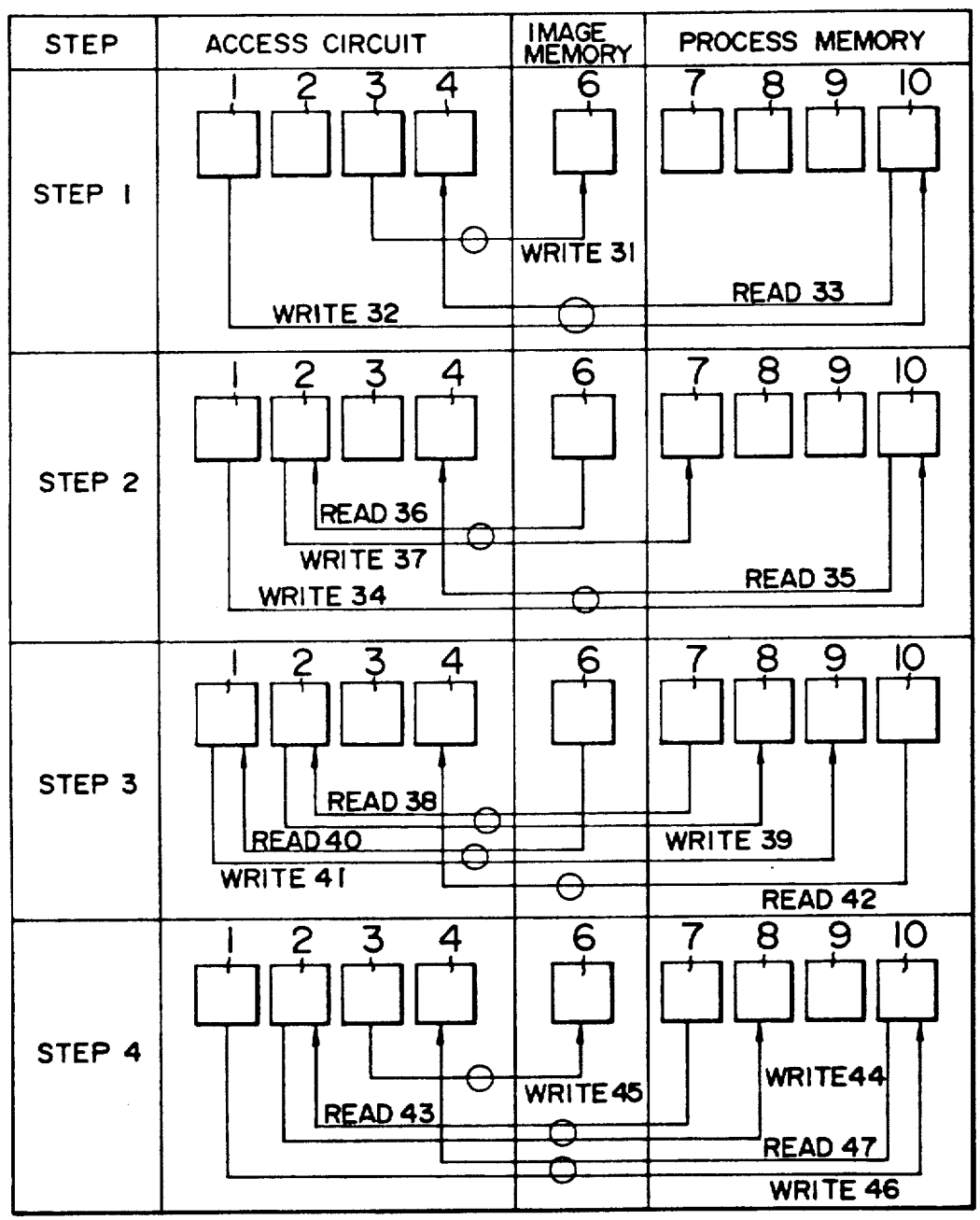
FIG. 2 is a diagram showing the operation of the above embodiment.

An example of operation of this embodiment will be described with reference to FIG. 2. FIG. 2 shows four cases from step 1 to step 4 in which a plurality of access circuits operate simultaneously. Those blocks of FIG. 2 which are identical with those of FIG. 1 are designated by the same reference numerals. The round marks on the lines indicate the access operation sequences which are performed simultaneously. For example in step 1, the access operation sequence of writing 31 data to image memory 61 by access circuit 3 is performed at the same time as the access operation sequence of reading 33 data from process memory 10 by access circuit 4 and writing 32 data to process memory 10 by access circuit 1. The round marks, as will be clear below, do not indicate that the reading 33 and writing 32 to process memory 10 are performed simultaneously.

In FIG. 2, step 1 is a case where receiving of digital data from the A/D converter circuit 14 and display on the monitor 16 are performed at the same time.

The access circuit 1 simultaneously writes in the command register of the command/status register 5 three commands, that is, a command to the access circuit 3 directing it to receiving digital data, a command to the access switchover circuit 11 to access the image memory 6 to write data, and a command to the access switchover circuit 12 to enable the access circuit 1 to access the process memory 10 to write data. The access circuit 3 gets digital data from the A/D converter circuit 14, and writes the digital data in the image memory 6 via the access switchover circuit 11 (WRITE 31). In parallel with this, the access circuit 1 accesses the process memory 10 via the access switchover circuit 12, and writes digital data, which has been processed by using the RAM 18 and which is to be displayed, in the process memory 10 (WRITE 32). When this writing in the process memory 10 has been completed, the access circuit 1 rewrites at the command register of the command/status register 5 the commands, executed as described, with a command to the access switchover circuit 12 to enable the access circuit 4 to access the process memory 10 to read data and a command to the access circuit 4 for image display on the monitor 16. The access circuit 4 reads processed digital data from the process memory 10 via the access switchover circuit 12 (READ 33), and feeds the digital data to the D/A converter circuit 15 to effect image display on the monitor 16.

On the other hand, the access circuit 1 monitors the status of the access circuit 3 by status data stored in the status register of the command/status register 5. When writing by the access circuit 3 into the image memory 6 (WRITE 31) has been completed, the access circuit 1 detects the completion of writing, and terminates the step 1. Thus, writing of image into memory (WRITE 31), and writing of data to be used for display (WRITE 32), and display (READ 33) of the data are performed simultaneously.

Step 2 shows a case in which a processing of digital data which are written in the image mamory 6 and an image display process at the monitor 16 are performed simultaneously.

In step 2, as in step 1, an image display process is performed in which the access circuit 1 writes processed digital data to be used for display in the process memory 10, and after this writing is finished, writes an image display command in the command register of the command/status register 5 (WRITE 34), and the access circuit 4 accesses the process memory 10 to read data (READ 35).

Written in the command register together with the commands executed as mentioned above are a command to the access switchover circuit 11 to enable the access circuit 2 to access the image memory 6 to read data and a process command to the access circuit 2. Therefore, in parallel with the above-mentioned display process, the access circuit 2 reads digital data from the image memory 6 via the access switchover circuit 11 (READ 36), and also processes digital data obtained by executing an operation program in the RAM 19, which corresponds to the above-mentioned process command. In addition, the access circuit 1 writes in the command register of the command/status register 5 a command to the access switchover circuit 12 to enable the access circuit 2 to acess the process memory 7 to write data, and opens the bus leading to the process memory 7.

Digital data read from the image memory 6 processed in the access circuit 2 is sent sequentially through the access switchover circuit 12 and written in the process memory 7 (WRITE 37). After the access circuit 2 has finished the execution of the specified operation program, the access circuit 1 reads data on the status of the access circuit 2, stored in the status register of the command/status register 5, and on detecting completion of the data processing operation by the access circuit 2 paerformed according to an operation program, the access circuit 1 terminates the step 2.

In the step 2, reading and processing image data (READ 36, WRITE 37), writing for display (WRITE 34), and reading the process memory (READ 35) are performed simultaneously.

Step 3 shows a case of simultaneous executions of reading and processing of image data, re-processing of processed data and display.

The access circuit 1 writes specified commands in the command register of the command/status register 5. Therefore, the access circuit 2 accesses the process memory 7 via the access switchover circuit 12 to read data from the memory 7 (READ 38), processes digital data read from the process memory 7 according to an operation program in the RAM 19, and writes the processed digital data in the process memory 8 via the access switchover circuit 12 (WRITE 39).

On the other hand, after writing the commands for the above operations in the command register of the command/status register 5, the access circuit 1 accesses the image memory 6 via the access switchover circuit 11 to read digital data from the memory (READ 40), processes the retrieved digital data by using the RAM 18 and according to a program stored in the ROM 17, and writes the processed digital data in the process memory 9 via the access switchover circuit 12 (WRITE 41).

At this time, by a command stored in the command register of the command/status register 5, the access circuit 4 reads processed digital data from the process memory 10 (READ 42), and sends the data to the D/A converter circuit 15 (READ 42).

After the processing of digital data is finished, the access circuit 1 reads status data representing the status of the access circuit 2, stored in the status register of the command/status register 5, and on detecting completion of the processing operation by the access circuit 2 performed according to an operation program, the access circuit 1 terminates the step 3.

Therefore, reading and processing of image data (READ 40, WRITE 41), re-processing of processed data (READ 38, WRITE 39), and reading for display (READ 42) take place simultaneously.

Step 4 shows a case of simultaneous executions of input of digital data, re-processing of processed data and image display.

The access circuit 1 writes specified commands in the command register of the command/status register 5.

As a result, the access circuit 2 reads digital data from the process memory 7 (READ 43), and processes the data, and writes the processsed data in the process memory 8 (WRITE 44). At the same time, the access circuit 3 reads digital data from the A/D converter circuit 14, and writes the data in the image memory 6 (WRITE 45). On the other hand, after completing the writing of the commands for the above operations in the command/status register 5, the access circuit 1 writes digital data to be used for display in the process memory 10 (WRITE 46), and after this, causes the access circuit 4 to access the process memory 10 to read data so that an image is displayed by the digital data (READ 47).

After this, when detecting from status data in the status register of the command/status register 5 that the operations by the access circuits 2, 3 have been completed, the access circuit 1 terminates the step 4.

In the step 4, reading of image data (WRITE 45), re-processing of processed data (READ 43, WRITE 44), and reading and writing for display (WRITE 46, READ 47) take place simultaneously.

If image data is input and processed and the processed data is used for display, a necessary step out of the steps 1 to 4 is executed to perform a process required for the image data.

As discussed above, in this embodiment, any of those access circuits can be operated in any combination in concurrent operation. Since one access circuit monitors and controls the other access circuits, a simultaneous execution of a plurality of processes can be performed by an optimal distribution of operation timing among the access circuits, so that image processing time can be reduced substantially.

The image memory 6 and the process memories 7 to 10 have only to have a single bus. Therefore, those memories can be organized in a simple circuit configuration, the access switchover circuits can be connected in a simple circuit configuration, so that a low-price small-scale image processing apparatus can be produced.

In the above embodiment, four process memories are used, but this number is just one example and may be any number other than this. The access circuits 1, 2 are not necessarily restrictd to accessing the process memories only as shown in the steps of FIG. 2. It goes without saying that the access circuit 4 can read digital data both from the image memory 6 and the process memories 7 to 10.

Figure 3:
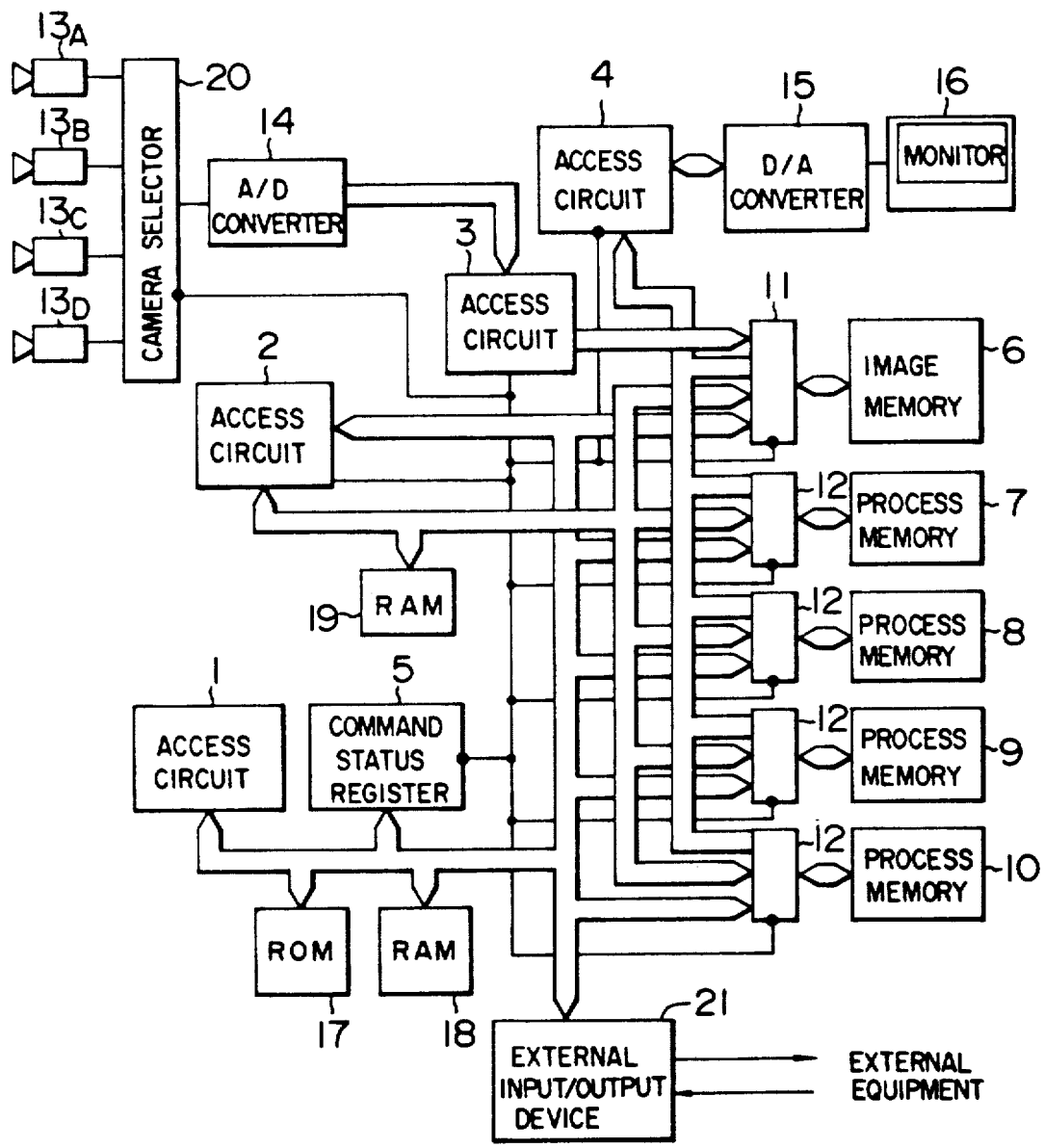
FIG. 3 is a block diagram showing another embodiment of the image processing apparatus according to this invention.

FIG. 3 is a block diagram showing another embodiment of the image processing apparatus according to this invention. Reference numerals 13A to 13D indicate video cameras, 20 a camera selector, and 21 an external input/output device. Those parts which correspond to the parts in FIG. 1 are designated by the same numerals.

This embodiment has been made to enable video signals to be sequentially read at high speed from the four video cameras and processed.

In FIG. 3, as in the embodiment of FIG. 1, the access circuits 2 to 4 and the access switchover circuits 11, 12 are controlled according to commands written by the access circuit 1 in the command register of the command/status register 5. One of the four video cameras 13A to 13D is selected by a camera selector 20 according to a command stored in the command/status register 5.

An output signal from a video camera selected by the camera selector 20 is digitized by the A/D converter circuit 14, and then written in the image memory 6 by the access circuit 3. The access circuit 1 monitors the status of the access circuits 2 to 4, the access switchover circuits 11, 12, and the camera selector 20 by status data stored in the command/status register 5. When the access circuit 3 has completed writing of image data into the image memory 6, the access circuit 1 or 2 reads digital data from the image memory 6 and processes the data to obtain necessary data, and writes it in any one of the process memories 7 to 10.

The access circuit 4 reads digital data from any one of the image memory 6 and the process memories 7 to 10, and sends the data to the D/A converter circuit 15. An analog video signal is output from the D/A converter circuit 15, and is sent to the monitor 16 to form images on the monitor 16.

When a picture is synthesized by combining images from a plurality of video cameras, digital data is read from a plurality of process memories and sent to the D/A converter circuit 15.

The external input/output device 21 inputs digital data from external equipment (not shown) into the system or outputs digital data processed by the access circuits 1, 2 to the external equipment.

With reference to FIG. 4, description will now be made of the processing operation in this embodiment of video signals outputted from the video cameras 13A to 13D. The camera selector 20 selects the video cameras 13A to 13D sequentially. The selection sequence may be arbitrary. In this case, however, it is assumed that the video cameras are selected in the order of 13A to 13B to 13C to 13D.

If the camera selector 20 selects the video camera 13A, digital data from this camera is written by the access circuit 3 into the image memory 6 (step 101). When this writing step is finished (step 102), the access circuit 1 confirms this by status data in the command/status register 5 and reads necessary data from the image memory 6, and writes into the process memory 7 (step 103).

When this writing is finished, the access circuit 1 writes commands in the command/status register 5, causes the camera selector 20 to select the next video camera 13B, and also causes the access circuit 3 to write digital data outputted from the video camera 13B into the image memory 6. While this writing operation is taking place, the access circuit 1 or 2 reads digital data from the process memory 7, processes the data, and writes in the process memory (step 104).

When writing of digital data outputted from the video camera 13B into the image memory 6 is finished (step 105), the digital data is transferred from the image memory 6 into the process memory 8 (step 106). In the same way as mentioned above, digital data outputted from the video camera 13C is written into the image memory 6, and the access circuit 1 or 2 reads digital data from the process memory 8, processes the data and writes back into the process memory 8 (step 107). When data processing and writing into the image memory are finished (step 108), digital data is transferred from the image memory 6 into the process memory 9 (step 109).

Then, digital data outputted from the video camera 13D is written into the image memory 6. Also, digital data in the process memory 9 is read and processed by the access circuit 1 or 2 and written back into the process memory 9 (step 110). When writing into the image memory 6 is finished (step 111), the digital data is transferred from the image memory 6 into the process memory 10 (step 112). The digital data is processed by the access circuit 1 or 2, and written into the process memory 10 (step 113).

In the manner described, digital data from the video cameras 13A to 13D is processed one after another and stored in the separate process memories 7 to 10. By the image processing method as described, out of data stored in the image memory 6, required data is transferred at high speed into the process memory. Therefore, a required waiting time until an image is inputted from the next video camera becomes very short. In addition, input of a new image and processing of image data take place at the same time, with the result that image processing by the whole system can be done at high speed.

When any one of images from a plurality of video cameras is displayed, by commands written by the access circuit 1 into the command/status register 5, processed digital data is read by the access circuit 4, sent to the D/A converter circuit 15, changed into an analog video signal, provided to the monitor to display an image. When necessary, this apparatus may be designed such that digital data in the process memories 7 to 10 is read out, and sent by the external input/output device 21 to external equipment (step 110). When images from a plurality of video cameras are all shown sequentially, the access circuit 4 may be arranged so as to read digital data immediately after the data in the process memory 7 has been processed and similarly read digital data form the process memories 8, 9, and 10 sequentially after the data has been processed.

When a synthesized image made by images from a plurality of video cameras is displayed, the access circuit 4 is used to sequentially access a plurality of process memories, and the data which is read is combined and provided to the D/A converter circuit 15.

The foregoing also applies to a case in which digital data is input from external equipment via an external input/output device 21. To be more specific, digital data is stored temporarily in the RAM 18, and after processed by the access circuit 1, the digital data is written into any of the process memories 7 to 10.

The number of video cameras used may be more than four. According to the number of video cameras, the number of process memories used is set. Needless to say, by additionally providing necessary process memories, any digital data can be processed in the processes of the steps in FIG. 2.

As has been described, also in this embodiment, any of those access circuits in any combination can access different memories simultaneously. Therefore, the input from the video camera and processing of digital data in memory can be performed simultaneously, and data from a plurality of video cameras can be processed quickly. As a process memory is provided for each video camera, output of the different video cameras can be processed mutually independently, and a wide range of image information can be processed with high resolution.

We claim:

1. An image processing apparatus, comprising:
   an image memory for storing a video signal in digital form obtained by A/D conversion of an analog video signal;
   first access means for writing said video signal in said image memory;
   a plurality of process memories for storing processed data obtained by processing said video signal stored in said image memory;

a plurality of second access means for accessing said image memory and said process memories, performing specified data processing on said video signal from said image memory and storing said processed data in said process memories;

third access means having the same function as said second access means, and a further function of controlling the operation of said first and second access means, whereby, out of said access means, a plurality of access means can perform access operations simultaneously;

display means for converting a signal from one of said second access means into an analog signal by D/A conversion and displaying an image;

wherein said third access means includes switch means for storing command/monitor data upon control of the operation of said first and second access means, upon monitoring of operating status of said first and second access means and upon switchover control of access switchover means, whereby a writing operation of said video signal by said first access means, said processing of a video signal already entered and a display operation by said display means can all be performed in any combination simultaneously; and means for selecting one image signal out of a plurality of video signals, wherein said switch means stores said command/monitor data for allowing a simultaneous execution of said writing operation into said image memory by said first access means and said processing of a video signal, already entered, by said second or third access means.

2. An image processing method comprising the steps of:

(a) selecting one video signal from a plurality of video signals;

(b) writing said selected video signal, obtained by A/D conversion, into an image memory;

(c) after said writing into said image memory is finished, taking out necessary data out of said written video signals, and transferring said data into a first process memory;

(d) selecting one other video signal out of said plurality of video signals, changing said video signal into digital form by A/D conversion, writing said video signal in said image memory, and at the same time, processing data in said first process memory;

(e) writing said processed data into said first process memory again;

(f) sequentially changing said process memory to a second process memory, a third process memory, . . . an n-th process memory, said process memories being provided to correspond to said selected video signals, and executing said steps (a) to (e) with each process memory; and (g) reading data from said process memory necessary for display out of said plurality of process memories and displaying an image.

* * * * *